UNITED STATES PATENT OFFICE.

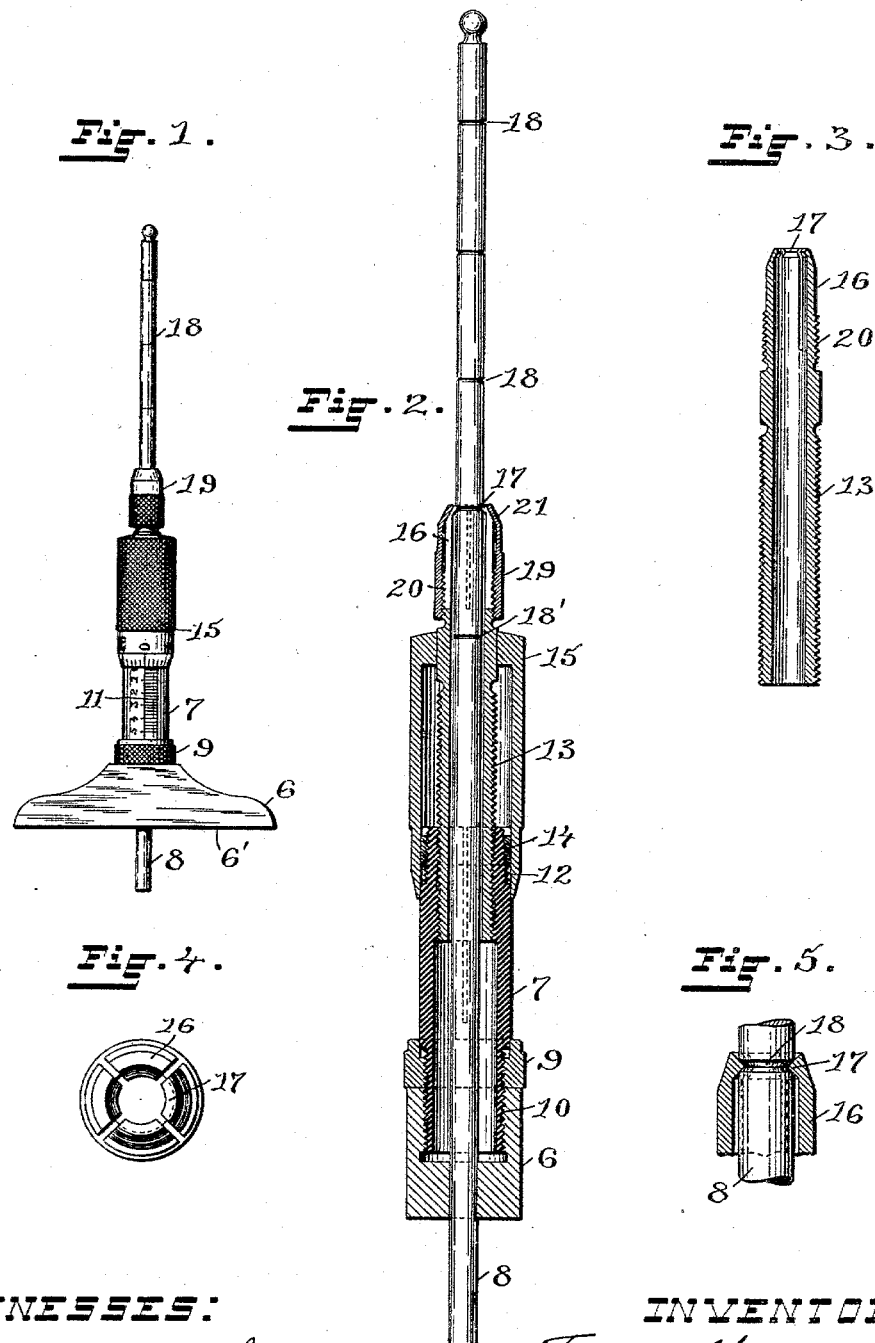

FRANK SPALDING, OF PROVIDENCE, RHODE ISLAND, ASSIGNOR TO THE BROWN & SHARPE MANUFACTURING COMPANY, OF SAME PLACE.

MICROMETER DEPTH-GAGE.

SPECIFICATION forming part of Letters Patent No. 597,335, dated January 11, 1898.

Application filed March 29, 1897. Serial No. 629,727. (No model.)

*To all whom it may concern:*

Be it known that I, FRANK SPALDING, of Providence, in the county of Providence and State of Rhode Island, have invented a new and useful Improvement in Micrometer-Gages; and I hereby declare that the following is a full, clear, and exact description of the same, reference being had to the accompanying drawings, forming part of this specification.

This invention has reference to an improvement in micrometer-gages adapted for measuring accurately the depth of a hole, the length or the width of an article, or the distance from one edge to a given point by a micrometer-scale.

The invention consists in the peculiar and novel construction of the gage by means of which the measuring is facilitated, as will be more fully set forth hereinafter.

Figure 1 is a side view of the micrometer-gage. Fig. 2 is a transverse sectional view of the same on an enlarged scale. Fig. 3 is a sectional view of the tubular micrometer-spindle, showing the same provided with a clamping end. Fig. 4 is an end view of the clamping end of the tubular spindle shown in Fig. 3 on a magnified scale, and Fig. 5 is a sectional view of the clamping end of the tubular micrometer-spindle.

Similar numerals of reference indicate corresponding parts in all the figures.

In the drawings, 6 indicates the base, which is provided with an internally-screw-threaded socket to receive one end of the barrel 7, and also perforated to permit of the passage of the rod 8. The lock-nut 9, peripherically milled or roughened, engages with the screw-thread 10 on the barrel 7. The cylindrical portion of the barrel 7 is provided with the scale 11. The upper end of the barrel 7 is internally screw-threaded and has the tapering end 12, which is divided by four longitudinal slits into fingers externally screw-threaded. The tubular micrometer-spindle 13 engages with the internal screw-thread of the barrel 7, and the screw-threaded clamping-ring 14 is used to regulate the friction between the internal screw-thread on the barrel 7 and the screw-thread on the tubular spindle 13, so as to prevent backlash. The indicator-sleeve 15, beveled at its lower edge, is provided with a peripheral scale at its lower end. The peripheral surface of the main portion is milled or roughened.

The upper end 16 of the tubular spindle 13 is divided longitudinally by four slits, as shown in Fig. 4, and the upper end is provided with the annular rectangular clips 17, which engage with the rectangular grooves 18, placed at predetermined distances apart on the rod 8. The clamp 19, internally screw-threaded, engages with the screw-thread 20 on the tubular spindle 13, and the conical end 21 clamps the rectangular clips 17 into the groove 18 and thereby secures the rod 8 at predetermined intervals. The clamp-piece 19 has part of its outer surface milled or roughened to facilitate the turning of the same.

Having described the parts, I will now more fully describe the operation of the same.

The gage is designed for use in measuring by micrometer measurement the depth of holes, grooves, or recessed parts, the distance from the ends, the sides, or from a shoulder to any desired point, and for other purposes for which it may prove adapted.

One object of the invention is to facilitate the measuring of varying depths or distances by a micrometer-gage.

Another object of the invention is to provide for accurate adjustment of the gage and for readjustment of the parts necessitated by the wear of the parts, and to these ends I provide the rod 8 with a series of annular V-shaped grooves, the two inclined surfaces of which grooves are made preferably at right angles to each other. The sides of these grooves may be at an angle of less than ninety degrees to each other, but when of a greater angle than the right angle the adjustment is not as reliable as is required in a gage designed to measure micrometrically. The annular groove 18', which is the lowest shown in Fig. 2, may be termed the "standard" groove, for when the clips 17 are engaged in this groove 18' and held in this groove by the clamp 19 the lower end of the rod 8 must be exactly even with the extended surface 6' of the base 6, the lower end of the beveled annular edge of the sleeve 15 must be at "0,"

the zero-line of the scale 11, and the "0" or zero-line on the beveled end of the sleeve 15 must be on the vertical line of the scale 11, as is indicated in Fig. 1. If when adjusted to zero the lower end of the rod 8 is not exactly on a line with the bearing-surface 6' of the base 6, the lock-nut 9 is released and the base 6 is turned on the screw-thread 10 until the surface 6' of the base 6 is exactly on a line with the end of the rod 8. When the scales are at the zero-mark, the lock-nut 9 is then turned firmly against the base 6 to secure the same in the adjusted position. Any wear on the face 6' of the base 6 or of the end of the rod 8 will not affect the accuracy of the gage, which is adjusted from time to time, as above described.

The distances between the annular grooves 18 18 are equal to the length of the scale 11. These distances may be of any desired standard length. As indicated in Fig. 1 they are one-half of an inch. As indicated in Fig. 2 they are one inch. They may be any predetermined distance, preferably of a unit or fraction of a unit, of a standard scale. By turning the clamp 19 so as to release the clips 17 from the groove the rod 8 may be projected one, two, three, or more lengths of the standard distance from the face 6'. The clips 17 are now secured in one of the grooves 18 by the clamp 19, and the additional micrometer measurement is made by turning the sleeve 15 and reading the distance on the micrometer-scale.

By this construction the gage is equally well adapted for measuring fractions of an inch and distances of two, three, or more inches and fractions of inches by micrometric measurement.

Having thus described my invention, I claim as new and desire to secure by Letters Patent—

1. In a micrometer depth-gage, the combination with the graduated and internally-screw-threaded barrel, the base secured to one end of the barrel, of a tubular screw-threaded spindle, a sleeve secured to the tubular screw-threaded spindle, a spring-clamp on the upper end of the tubular screw-threaded spindle, a rod extending through the tubular screw-threaded spindle, and annular grooves on the rod, whereby the rod is held at the desired place by the spring-clamp, and is adjusted for micrometric measurement by turning the graduated sleeve, as described.

2. In a micrometer depth-gage, the combination with the graduated and internally-screw-threaded barrel, the tubular screw-threaded spindle, a clamp on the upper end of the tubular screw-threaded spindle, a graduated sleeve secured to the tubular screw-threaded spindle, and a rod extending through the tubular screw-threaded spindle and secured by the clamp, of the base 6, secured to the internally-screw-threaded barrel by screw-thread engagement and the nut 9, whereby the base may be adjusted to compensate for wear, as described.

3. In a micrometer depth-gage, the combination of the following instrumentalities: a barrel, internally screw-threaded, for the leading screw or spindle, a tubular leading screw or spindle, a graduated sleeve secured to the spindle, a base secured to the end of the barrel opposite to the end in which the spindle is secured, a rod divided part of its length by annular grooves into predetermined lengths, said rod extending through the tubular spindle and through the base, spring-clips adapted to enter the annular grooves on the rod, and a clamp, acting on the spring-clips, whereby the rod may be projected a predetermined distance beyond the base and then micrometrically adjusted to secure the accurate measurement, as described.

4. In a micrometer depth-gage, the combination with the barrel 7, the tubular spindle 13, the sleeve 15 secured to the spindle, the base 6 secured by screw-thread engagement to the barrel 7, and the nut 9, of the spring-clips 17 forming part of the upper end of the spindle 13, the clamp 19 for controlling the spring-clips 17, and the rod 8 subdivided part of its length by the grooves 18 18 and extending through the base 6 and through the tubular spindle 13, as and for the purpose substantially as described.

In witness whereof I have hereunto set my hand.

FRANK SPALDING.

Witnesses:
M. F. BLIGH,
JOSEPH A. MILLER, Jr.